(12) United States Patent
Chung

(10) Patent No.: US 6,363,049 B1
(45) Date of Patent: Mar. 26, 2002

(54) ADAPTIVE ACQUISITION SYSTEM FOR CDMA AND SPREAD SPECTRUM SYSTEMS COMPENSATING FOR FREQUENCY OFFSET AND NOISE

(75) Inventor: Sanguoon Chung, San Diego, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/047,679

(22) Filed: Mar. 25, 1998

(51) Int. Cl.[7] ................................. H04J 11/00
(52) U.S. Cl. ................ 370/210; 370/342; 375/140; 375/130
(58) Field of Search .................. 370/210, 310, 370/211, 212, 213, 215, 229, 241, 254, 259, 273, 276, 297, 298, 308, 309, 351, 431, 464, 914, 278, 324, 331, 342, 349, 509, 516, 145, 149, 150, 222, 367, 152; 375/130, 140, 150, 200, 208

(56) References Cited

U.S. PATENT DOCUMENTS

| | | | | |
|---|---|---|---|---|
| 5,175,743 A | * | 12/1992 | Crespo et al. | ............ 370/210 |
| 5,440,597 A | * | 8/1995 | Chung et al. | ............ 375/200 |
| 5,577,022 A | * | 11/1996 | Padovani et al. | ............ 370/332 |
| 5,732,111 A | * | 3/1998 | Walley | ............ 375/344 |
| 6,005,889 A | * | 12/1999 | Chung et al. | ............ 375/208 |
| 6,055,264 A | * | 4/2000 | Kenney et al. | ............ 375/150 |
| 6,091,703 A | * | 7/2000 | Saunders et al. | ............ 370/210 |
| 6,097,770 A | * | 8/2000 | Bahai | ............ 375/343 |
| 6,144,691 A | * | 11/2000 | Kenney | ............ 375/130 |
| 6,266,361 B1 | * | 7/2001 | Huang | ............ 375/140 |

* cited by examiner

*Primary Examiner*—Douglas Olms
*Assistant Examiner*—Ricardo M. Pizarro
(74) *Attorney, Agent, or Firm*—Frommer Lawrence & Haug LLP; William S. Frommer; Gordon Kessler

(57) ABSTRACT

An improved Pseudo Noise (PN) code acquisition apparatus and method for Code Division Multiple Access (CDMA) Direct Sequence Spread Spectrum (DSSS) systems which utilize a Fourier Transform and which operate in both additive white Gaussian noise and frequency offset environments. The signal to noise ratio (SNR) is generated and used not only to make the decision of when to stop the signal search process but also to adjust the search rate. The Fourier transform is implemented in ASIC hardware to estimate frequency offset. To further speed up its processing, the Fourier transform is performed using shift and add operations by employing canonic sign digit representation of the eigen vector of the Fourier transform. Detection probability is increased and false alarm probability is reduced significantly, especially in a frequency offset environment.

19 Claims, 5 Drawing Sheets

ADAPTIVE ACQUISITION SYSTEM FOR CDMA AND SPREAD SPECTRUM SYSTEMS COMPENSATING FOR FREQUENCY OFFSET AND NOISE

BACKGROUND OF THE INVENTION

This invention relates generally to a pseudo noise code acquisition system for Code Division Multiple Access ("CDMA") and Direct Sequence Spread Spectrum (DSSS) systems such as for use with a cellular communication device, and more particularly to an acquisition system which improves operation in both a white gaussian noise and frequency offset environment and which determines the signal to noise ratio (SNR) in order to determine when to stop the search process and to adjust the search rate.

Conventional acquisition systems use non-coherent addition of the partial correlation of the transmitted and received Pseudo Noise (PN) signal to mitigate the frequency offset effect during synchronization and acquisition. The primary function of synchronization in a spread spectrum communication system is to despread the pseudo noise (PN) code for demodulation of the received signal. This is accomplished by generating a local replica of the PN code in the receiver and then synchronizing the local PN signal to the PN signal which is superimposed on an incoming received signal. The process of synchronization is usually accomplished in two steps. The first step, called acquisition, consists of bringing the two codes into coarse time alignment within one code chip interval. The second step, called tracking, then takes over and continuously maintains the best possible waveform alignment between the superimposed PN signal and the locally generated PN signal by means of a feedback loop. The focus of the present invention is on the acquisition aspect of the synchronization system.

Because of the importance of synchronization (or acquisition), many schemes have been proposed utilizing various types of detector and decision strategies in different application areas. A common feature of most synchronization schemes is that the received signal and the locally generated signal are correlated first to produce a measure of similarity between the two. Second, this measure is compared to a threshold to decide if those signals are in synchronism. If synchronization is detected, the tracking loop takes over. If there is no synchronization, the acquisition procedure provides a change in the phase of the locally generated PN code and another correlation is attempted as part of a systematic search through all of the possible phases of the PN signal of the receiver.

The speed and accuracy of acquisition is one of the major factors that limits the performance of CDMA receivers. Initial code acquisition is generally the most difficult operation to be performed in any spread spectrum system because of system performance impairment factors such as low signal to noise ratio (SNR), frequency offset due to imperfection of the frequency generator (crystal oscillator), doppler frequency shift, and fading environment. This invention is primarily directed to improving acquisition speed and accuracy in low SNR and frequency offset environments.

The maximum likelihood approach is a conventional, and the most robust acquisition approach when dealing with an Additive White Gaussian Noise (AWGN) environment. However, for long PN codes with large processing gain, such as those used in spread spectrum systems, the complexity of the parallel implementation or the time to search the entire code space in a serial implementation is often prohibitive.

A second approach employs a serial search which is performed by linearly varying the time difference between PN code with a continuous decision process determining when synchronization is achieved. Such a system is also referred to in the literature as single dwell sliding acquisition system and is illustrated in FIG. 1. Since the test for synchronization is based upon the crossing of a threshold, when compared with the serial maximum likelihood acquisition system (which requires a search of the entire spectrum) discussed earlier, this scheme trades off shorter acquisition time against reduced accuracy in detection of synchronization.

This conventional serial search (or algorithm) uses a predetermined fixed threshold for the detection of synchronization. However, as is known in the art, the best acquisition performance of the serial search approach (or system) can be obtained by using an optimal value for the threshold. In a practical communication environment, the optimal threshold is a function of signal to noise ratio (SNR) which may be different from one time and place to another.

In such a practical communication environment, an automatic level control for the determination of the decision threshold must be used for efficient operation of a direct sequence spread spectrum (DSSS) receiver. There are several articles published which have proposed automatic control for decision threshold, including U.S. Pat. No. 5,440,597, S. Chung and S. Czaja; S. Chung "A New Serial Search Acquisition Approach with Automatic Decision Threshold Control," Proc. IEEE Inter. Conf. On VTC, P. 530–36, July 1995; S. G. Glisic, "Automatic Decision Threshold Level Control (ADTLC) In Direct Sequence Spectrum Systems Based on Matched Filtering," IEEE Trans. on Commun., Vol. 36, P.519–28, April 1988; S. G. Glisic "Automatic Decision Threshold Level Control (ADTLC) In Direct Sequence Spread Spectrum Systems," IEEE Trans. on Commun. P.187–92, February 1991, each of which are incorporated herein by reference. The third and fourth of these automatic threshold control algorithms exploit the characteristics of noise in the system by employing two parallel signal energy detectors. The noise characteristics are obtained by despreading a received signal by applying two time displaced versions of the local PN code to the two parallel signal detectors and choosing the smaller signal energy from two outputs of the detectors. These automatic threshold control algorithms thus use the instantaneous noise characteristics of a filtered version of noise statistics to control their decision threshold. These algorithms also require the optimization of design parameters based on the expected SNR or communication environment, and therefore are still not fully signal adaptive. The second of these automatic control algorithms is a signal adaptive algorithm, and uses real time SNR statistics by estimating real time noise and signal estimate and making decisions based on the SNR estimates. However, even this acquisition system fails to adequately address the problems of acquisition in a frequency offset environment to insure more reliable acquisition.

Thus, while many acquisition approaches have heretofore been known which address the problem of an Additive White Gaussian Noise (AWGN) environment, there are no known acquisition approaches which adequately address the problems encountered in a frequency offset environment. Thus, it would be beneficial to provide an acquisition approach which adequately addresses both the AWGN and frequency offset problems and improves over the performance of existing acquisition approaches in both the AWGN and frequency offset environments.

OBJECTS OF THE INVENTION

Accordingly, it is an object of the invention to provide an improved adaptive acquisition system for CDMA and spread spectrum systems.

Another object of the invention is to provide an improved adaptive acquisition system for CDMA and spread spectrum systems which can efficiently operate in a frequency offset environment.

A further object of the invention is to provide an improved adaptive acquisition system for CDMA and spread spectrum systems which will increase detection probability and reduce false alarm probability significantly, especially in a frequency offset environment.

Still another object of the invention is to provide an improved adaptive acquisition system for CDMA and spread spectrum systems which utilizes a Fourier Transform to aid in estimating the frequency offset and to thus improve the detection probability and reduce false alarm probability.

Still other objects and advantages of the invention will in part be obvious and will in part be apparent from the specification and the drawings.

SUMMARY OF THE INVENTION

Generally speaking, in accordance with the invention, an improved adaptive acquisition system is provided for acquiring CDMA signals, which utilizes a Fourier transform on the partial correlation thereof to estimate the frequency offset and to determine energy by exploiting a coherent addition of the partial correlations on the frequency offset bin. The acquisition system of the invention then adaptively estimates an optimal threshold by exploiting the statistics of the signal and noise, thereby making an optimal decision based on the threshold. This threshold is estimated by employing maximal likelihood (ML) estimation. This threshold is applied in a serial search (SS) acquisition and makes a decision by comparing the updated threshold with the current signal strength.

In accordance with the new acquisition approach of the invention, the Fast Fourier Transform ("FFT") process is utilized to adequately address problems during acquisition not only in an AWGN environment but also in a frequency offset environment. The new acquisition system utilizes several conventional, and a number of new features. The conventional features include: signal detection and estimation, etc., and a noise energy estimator used in the estimation of the signal to noise ratio (SNR). The SNR is used to calculate the optimal threshold and the corresponding false alarm rate; and the false alarm rate is used to determine the number of noisy bins to be tested before stop search process after the detection of the synchronization candidate.

The new acquisition system of the invention also includes new features, including a frequency offset estimator which determines a frequency offset estimate by applying Fast Fourier Transform (FFT) on the partial correlation between the locally generated PN sequence and the PN signal superimposed on the received signal. The Fast Fourier transform is implemented in hardware and is performed using shift and adding operations in place of multiplication for fast processing. The estimated SNR obtained from calculations based upon the short correlation length (the first dwell) is employed to determine whether or not to use calculations based upon long correlation length (second dwell). The estimated SNR obtained from the long correlation length (the second dwell) is used as an auxiliary parameter to make a decision whether to stop the search process. This process makes acquisition faster and more reliable. The estimated SNR in the long correlation signal (second dwell) path allows for more reliable correlation. The estimated SNR obtained at the output of the acquisition process is used to adjust the searching rate. This may be the searching rate of the pilot signal in either a slotted mode or at the beginning of the acquisition procedure to save power.

The new acquisition system constructed in accordance with the invention applies a FFT process on the partial correlation and estimates the energy on the frequency offset bin, if the PN sequence between the received and locally generated signals are in synchronism. Unlike the conventional maximum likelihood systems, the system constructed in accordance with the invention makes a decision whenever a reliable synchronization is detected without having to search the entire PN space. Unlike conventional serial search systems, the new acquisition system constructed in accordance with the invention utilizes a signal dependent adaptive optimal threshold and stops the acquisition process after it is confirmed that a signal has been acquired. This process uses the estimated SNR, obtained as a by-product of the acquisition process, and pre-verification logic to confirm proper acquisition. By utilizing the FFT process in accordance with the invention, the acquisition approach achieves significantly faster acquisition compared to conventional acquisition approaches in a frequency offset environment.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
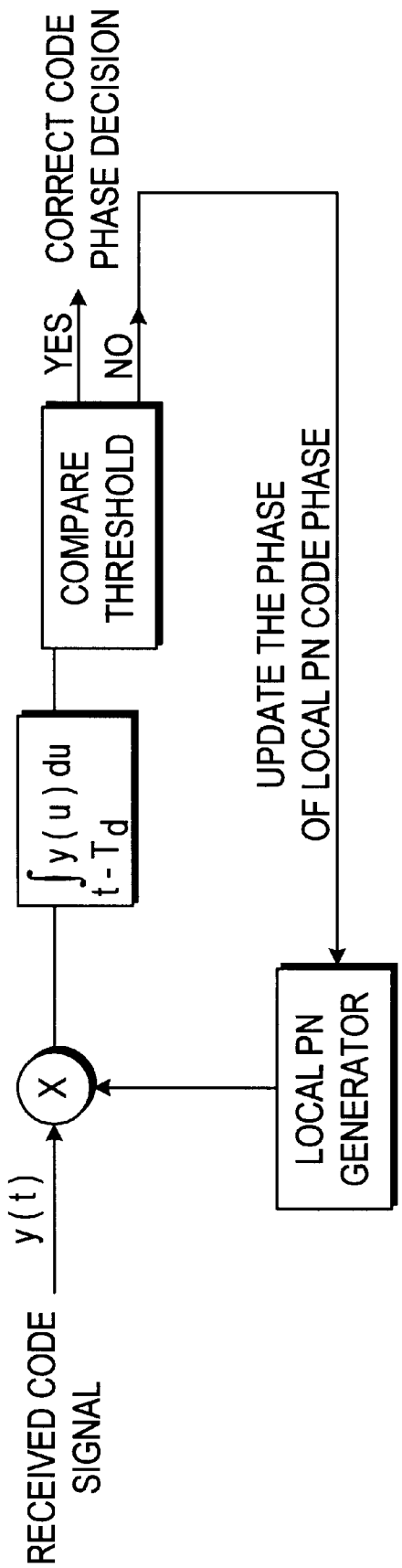
FIG. 1 is a block diagram depicting a conventional DS Single Dwell Serial Sliding Acquisition System.
Figure 2:
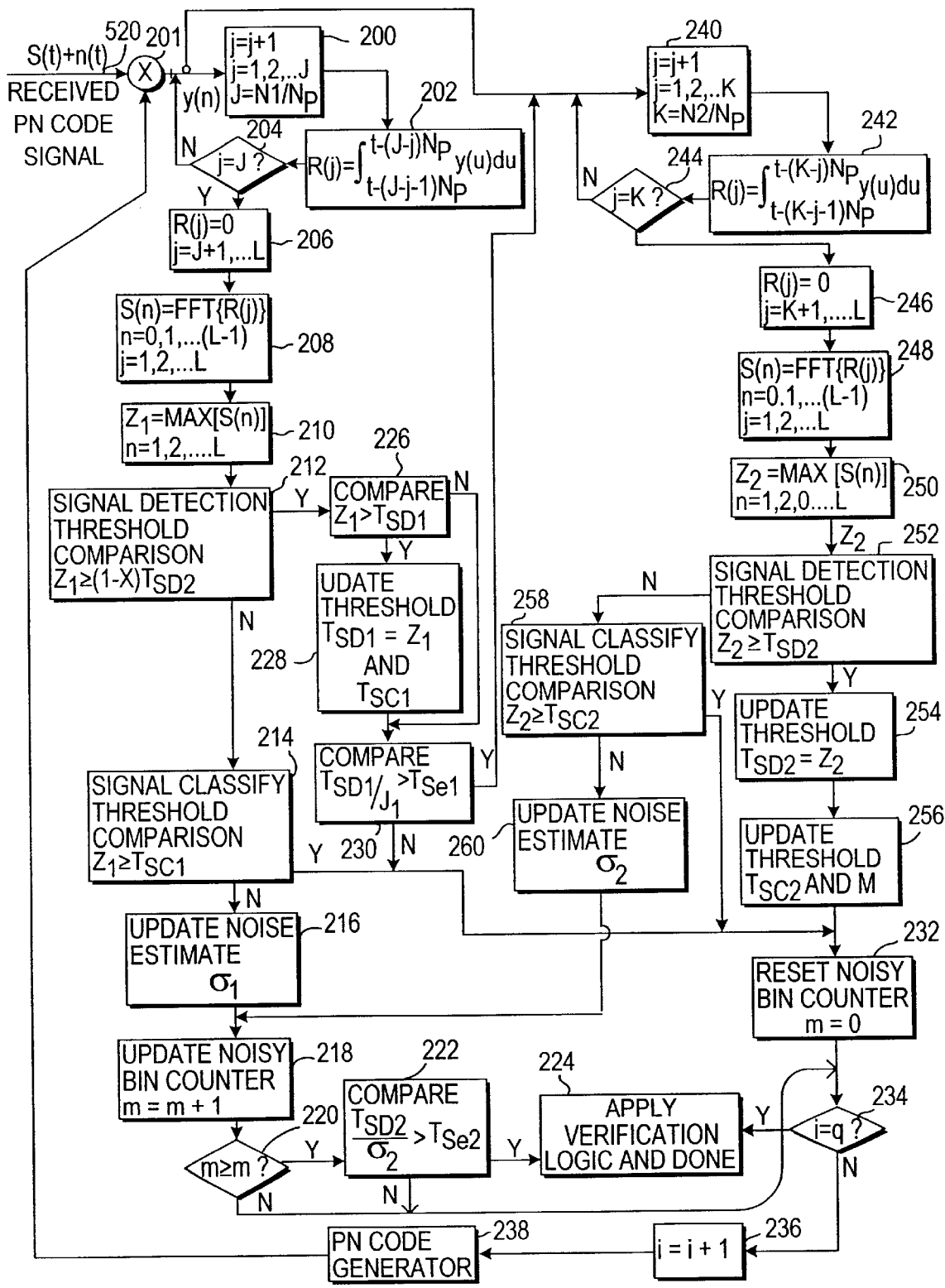
FIG. 2 is a block diagram depicting the Fourier Transform Aided Continuous Monitoring Search Correlation (FTACMSC) acquisition algorithm constructed in accordance with the invention.

Reference is first made to FIG. 2, which depicts a Fourier Transform Aided Continuous Monitoring Search Correlation (FTACMSC) acquisition algorithm constructed in accordance with the invention. The acquisition system according to the invention as depicted in FIG. 2 utilizes a first short correlator whose correlation length is N1 and a second long correlator whose correlation length is N2. The acquisition system also uses four adaptive thresholds, Tsc1, Tsd1, and Tsc2, Tsd2 for comparison with the outputs of the short and long correlators, respectively. Note that any number of the blocks in the block diagram of FIG. 2 may be implemented in either hardware or software. However, in a preferred embodiment blocks 200–212, 226, 228, 236, 238 and 240–256 are implemented in hardware to speed processing.

As is shown in FIG. 2, a PN code signal S(t) plus noise n(t) is received as signal S20 and is multiplied by the locally generated PN code at multiplication node 201 of the receiver. This result is applied to the integration of partial correlation size Np at block 200. J partial correlation values are obtained by applying this partial correlation process over a trial (or short) integration of N1 samples in blocks 202 and 204. After completion of this process, L-J zeros are placed in the correlation buffers at block 206. Then an L point FFT is determined in block 208. The numbers J and K are obtained by taking J=N1/(partial correlation size, Np) and K=N2/(partial correlation size, Np), respectively in ASIC hardware. The implementation of the FFT in ASIC hardware will now be described with reference to FIG. 3.

Figure 3:
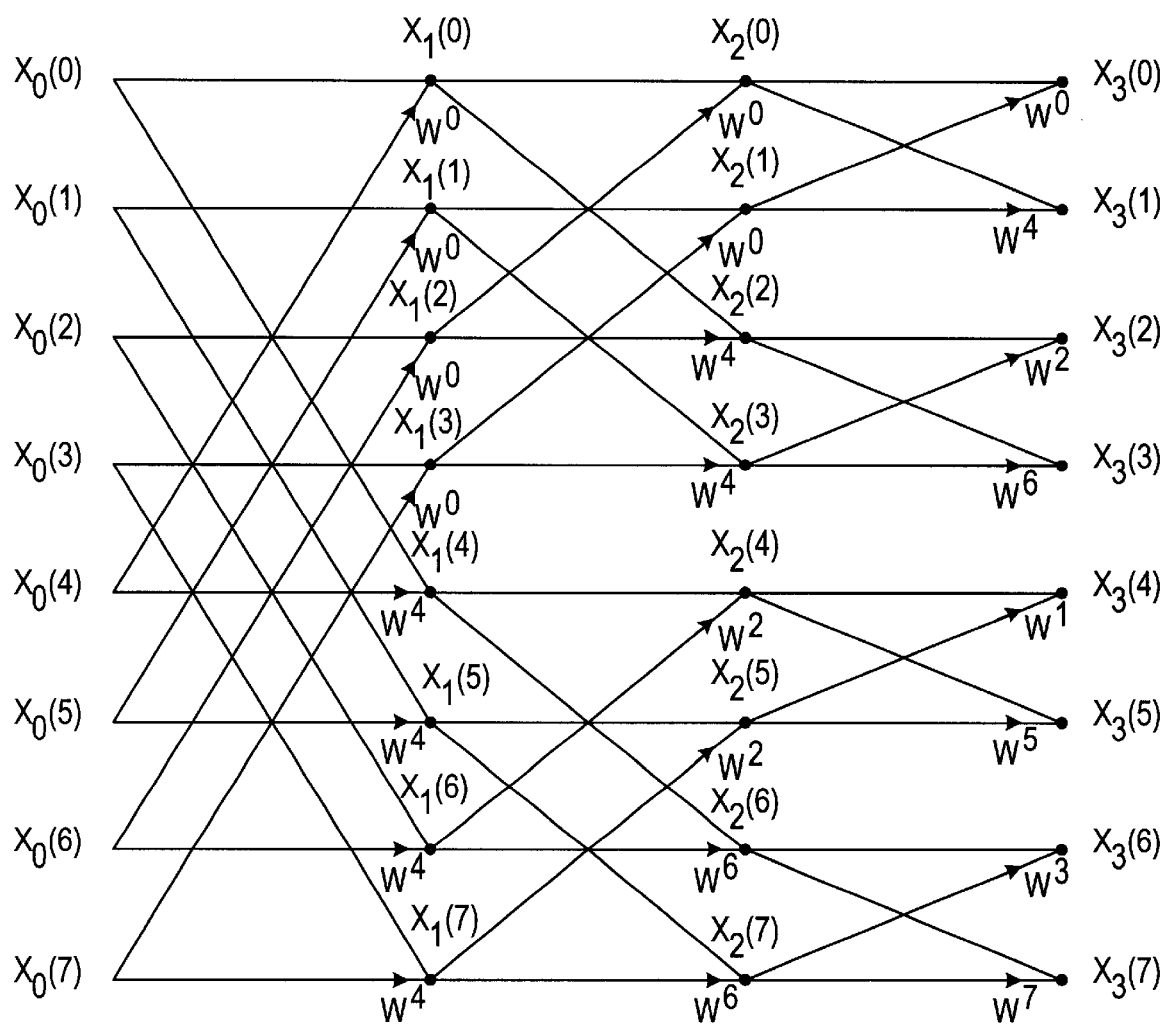
FIG. 3 depicts the implementation of the fast fourier transfer in hardware in accordance with the invention.

As is shown in FIG. 3, the FFT is implemented in hardware using only bit shifting and adding operations as follows. By way of example only, an 8 point FFT implementation will be illustrated, but other point FFT's may be used without departing from the spirit of the invention. First, L=8 partial correlation values, R(1), R(2), . . . , R(8), are obtained from the acquisition process (Block 202 and 206, FIG. 2). Then, these correlation values are stored as the input of L FFT input buffers as follows:

Xo(0)=R(1), Xo(1)=R(2), Xo(2)=R(3), Xo( 3)=R(4), Xo(4)=R(5), Xo(5)=R(6), Xo(6)=R( 7), Xo(7)=R(8).

Since an 8 point FFT is being taken, a 3 stage FFT butterfly as shown in FIG. 3 is required. The notation $w^j$ represents the eigen vector for the FFT in FIG. 3. The value of the $w^j$ is as follows.

$$w^0 = e^{j\phi} = 1$$

$$w^1 = e^{-j\frac{\pi}{4}} = 0.707107 - j0.707107$$

$$w^2 = e^{-j\frac{\pi}{2}} = -j$$

$$w^3 = e^{-j\frac{3\pi}{4}} = -0.707107 - j0.707107$$

$$w^4 = e^{-j\pi} = -1$$

$$w^5 = e^{-j\frac{5\pi}{4}} = -0.707107 + j0.707107$$

$$w^6 = e^{-j\frac{6\pi}{4}} = j$$

$$w^7 = e^{-j\frac{7\pi}{4}} = 0.707107 + j0.707107$$

The value of the eigen vector is obtained using bit shifting and adding as follows.

$$0.707107 \approx 1-2^{-2}<1+2^{-2}[1-2^{-2}\{1+2^{-1}(1-\frac{1}{2})\}]> = 0.70703$$

The value of the energy in the fifth frequency bin $X_3(4)$ can be obtained as follows (by way of example). The value of the energy in the other frequency bins may be calculated similarly.

$$X_3(4) = X_2(4) + w^1 X_2(5)$$
$$= X_2(4) + 0.707107(1-j)X_2(5)$$
$$\approx X_2(4) + 0.70703(1-j)X_2(5)$$
$$\triangleq X_2(4) + 0.70703Z$$

Figure 5:
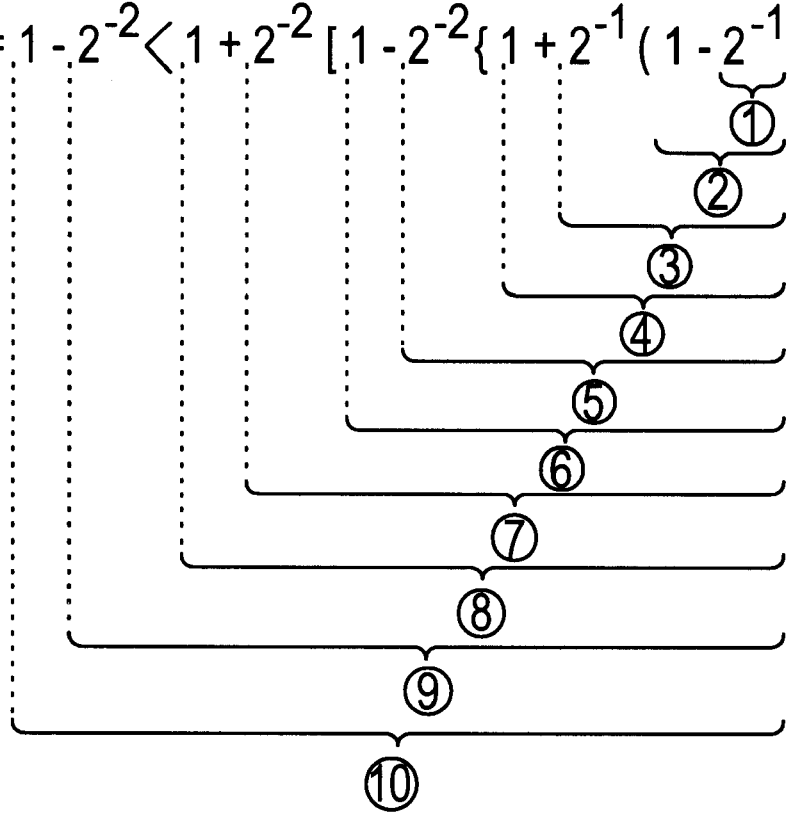
FIG. 5 depicts the steps utilized in determining a FFT in accordance with the invention.

Thus, for simplicity, the notation $Z=(1-j) X_2 (5)$ may be used. The result of 0.70703Z can be obtained by taking the following 10 steps as shown in FIG. 5.

$$0.70703 = 1-2^{-2}<1+2^{-2}[1-2^{-2}\{1+2^{-1}(1-2^{-1})\}]>$$

The above number 0.70703Z can be obtained in accordance with the invention using only hardware addition, subtraction and bit shifting by utilizing the following synthesize operation.

(1) Shift Z to the right by 1 bit: $A \triangleq 2^{-1} Z$ (2) Subtract A from Z resulting in B:

$$B \triangleq Z-A=Z (1-2^{-1})$$

(3) Shift B to the right by 1 bit resulting in C:

$$C \triangleq 2^{-1}B = 2^{-1}B = 2^{-1}Z(1-2^{-1}) = Z \cdot 2^{-1}(1-2^{-1})$$

(4) Add C to Z resulting in D:

$$D = Z+C = Z(1+2^{-1}(1-2^{-1}))$$

(5) Shift D to the right 2 bit resulting in E:

$$E = 2^{-2}D = Z \cdot 2^{-2}(1+2^{-1}(1-2^{-1}))$$

(6) Subtract E from Z resulting in F:

$$F = Z-E = Z(1-2^{-2}(1+2^{-1}(1-2^{-1})))$$

(7) Shift F to the right by 2 bits resulting in G:

$$G = 2^{-2}F = Z \cdot 2^{-2}(1-2^{-2}(1+2^{-1}(1-2^{-1})))$$

(8) Add G to Z resulting in H:

$$H = Z+G = Z(1+2^{-2}(1-2^{-2}(1+2^{-1}(1-2^{-1}))))$$

(9) Shift H to the right by 2 bits resulting in I:

$$I = 2^{-2}H = Z \cdot 2^{-2}(1+2^{-2}(1-2^{-2}(1+2^{-1}(1-2^{-1}))))$$

(10) Subtract I from Z resulting in J:

$$J = Z-I = Z(1-2^{-2}(1+2^{-2}(1-2^{-2}(1+2^{-1}(1-2^{-1})))))$$

Thus, through this procedure, it is determined that J=0.70703Z. Thus, through this implementation it is possible to determine the FFT using only addition, subtraction and bit shifting, all which may be implemented in hardware to speed up the calculation timing.

Referring once again to FIG. 2 and step 208, L is a power of 2 which is the minimum necessary number of steps for performing the FFT, but is larger than or equal to at least (J+K). At step 210, the frequency domain energy is obtained by setting $Z_1$ to the maximum energy in all of L frequency bins S (n), where n=1,2 . . . , L. If, at step 212, the frequency domain energy output at time t does not exceed (1-x) times the signal detection threshold Tsd1 where x is between 1/16 and 1/8 (which is the maximum energy output obtained previously until time t-1) then in step 214 the acquisition system compares the first frequency domain maximum energy output $Z_1$ with the signal classification threshold Tsc1 (which is the optimal threshold between the noise estimate and signal detection threshold TSd1). If the first frequency domain energy output $Z_1$ exceeds the signal classification threshold, then in step 232 the system resets the noisy bin (or incorrect cell) counter m to zero.

In step 234 the acquisition system then compares the current phase "i" with the number of PN phases in the total PN space "q" to confirm whether all of the PN phases have been searched. The "q" represents the total number of PN spaces divided by chip resolution. In a preferred embodiment half chip resolution is used. Thus, if the current PN phase "i" reaches the total "q", then the acquisition system stops the search process, and control passes to step 224 where the verification logic (which will be explained below) is applied and the procedure is complete. This is an indication that the acquisition system has searched all of the possible PN space, and the system is then to test the signal, or the decision quality.

However, if the current PN phase "i" does not reach the total "q", then in step 224 i will not equal q and control passes to step 236. In step 236 the phase of the locally generated code signal is changed by half of a chip, a new PN code is generated in step 238, and the correlation is re-examined.

If in step 214 the first frequency domain energy output $Z_1$ does not exceed the signal classification threshold Tsc1, the noise estimate for the first dwell is updated in step 216 by feeding the frequency domain energy output to the noise estimator (1-pole IIR or averaging operator), and the noisy bin counter m is increased by 1 in step 218. The noisy bin counter m is then compared with the threshold M in step 220. The threshold M is a predetermined number of noisy bins (or incorrect cells) to be counted before stopping a search after the detection of the synchronization candidate. The threshold M is obtained by exploiting the false alarm probability as will now be described.

Figure 4:
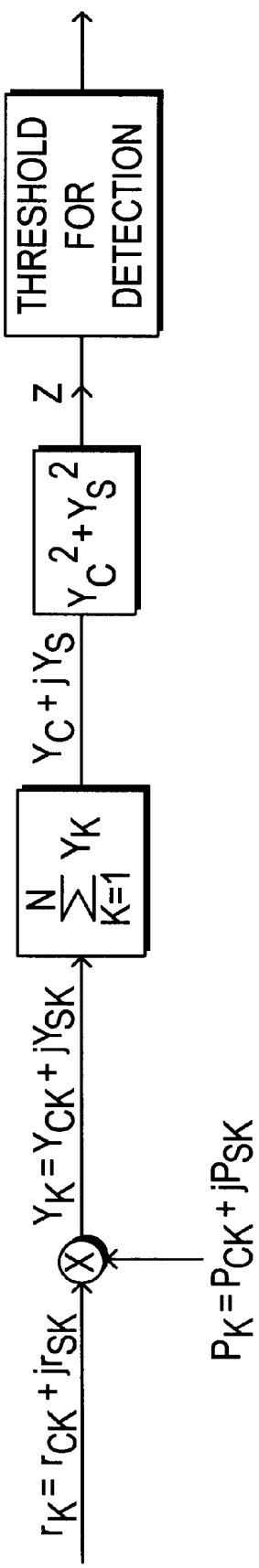
FIG. 4 depicts the general form of a signal detector constructed in accordance with the invention.

The key system parameters of the new acquisition algorithm of the invention which are determined are the signal classification threshold and the number of incorrect cells to be tested before stopping the search process, after detecting a signal candidate. The general form of a complex signal detector in a discrete system is illustrated in FIG. 4. In FIG. 4, an input signal rk to the receiver is multiplied by the PN code signal $p_k$. The multiplied output $y_k$, is coherently integrated over N chips. The received signal $r_k$ and the locally generated PN signal $p_k$ can be modeled as follows:

$$r_k = S_{k+\epsilon} + n_k \text{ and } p_k = S_{k+i},$$

where $S_{k+\epsilon}$ is the transmitted PN signal and $n_k$ is noise. The subscript $\epsilon$ is the offset of the transmitted PN signal. The multiplied output $y_k$ can be modeled by $$y_k = A_k + n_k = y_{ck} + jy_{sk} = (A_{ck} + n_{ck}) + j(A_{sk} + n_{sk}) \quad (1)$$

for a synchronization hypothesis ($= H_1$) i.e., $\epsilon = \hat{\epsilon}$, and $$y_k = n_k = y_{ck} + jy_{sk} = n_{ck} + jn_{sk} \quad (2)$$

for a non-synchronization hypothesis ($= H_0$), i.e., $\epsilon \ne \hat{\epsilon}$. The subscripts c and s represent the real and imaginary part of the signal, and the subscript k represents the $k^{th}$ sample in the coherent integration period. $n_{ck}$ and $n_{sk}$ are zero mean gaussian random variables with variance $\sigma^2_n = N_0/2$, and $A^2 = E_c$ where $E_c$ is energy per chip. Note that $y_{ck}$ and $y_{sk}$ are gaussian random variables with variance $\sigma^2_n$ and have two mean values depending on the hypothesis ($H_1$ or $H_0$). The integration of $y_k$ over N chips yields $$Y = Y_c + jY_s = \sum_{k=1}^{N} y_{ck} + j \sum_{k=1}^{N} y_{sk} \quad (3)$$

where $Y_c$ and $Y_s$ are gaussian random variables with mean value of NA or zero, depending upon the hypothesis the signal belongs to, and variance of $\sigma^2 = N\sigma^2_n$. The energy at the output of the square law envelope estimator is given by $$z = Y^2_c + Y^2_s. \quad (4)$$

Since $Y_c$ and $Y_s$ are statistically independent and identically distributed gaussian random variables, the energy z has a non central (for hypothesis $H_1$) or central (for hypothesis $H_0$) chi-square distribution with two degrees of freedom. For hypothesis $H_1$, cell, the probability density function (pdf) of the energy z is given asenergy z is given as $$p(z/H_1) = \frac{1}{2\sigma^2} \exp\left(\frac{-\zeta + s^2}{2\sigma^2}\right) I_0\left(\frac{s\sqrt{z}}{\sigma^2}\right) \quad (5)$$

where $$S^2 = 2N^2A^2 \text{ and } \sigma^2 = N\sigma^2_n \quad (6)$$

The mean value of the z:

$$E(z/H_1) = 2\sigma^2 + s^2 \quad (7)$$

and $I_0(.)$ is the zero order modified Bessel function of the first kind. The probability of missing a pilot signal after the integration is given by $$F_m(z) = \int_0^z P_X(x/H_1) dx = 1 - Q_1\left(\frac{s}{\sigma}, \frac{\sqrt{z}}{\sigma}\right) \quad (8)$$

$$= 1 - Q_1\left(\frac{\sqrt{2NE_c^2}}{\sigma_n}, \frac{\sqrt{z}}{\sqrt{N}\sigma_n}\right)$$

where $Q_n(.)$ is the generalized Marcum Q function. For hypothesis $H_0$ cell, the probability density function (pdf) of the energy z is given by $$p(z/H_0) = \frac{1}{2\sigma^2} \exp\left(-\frac{z}{2\sigma^2}\right) \quad (9)$$

The mean value of the z:

$$E(z/H_0) = 2\sigma^2 \quad (10)$$

The probability of false alarm after the integration is given by $$F_F(z) = \int_Z^\infty p_x(x/H_0) dx = \exp\left(-\frac{z}{2\sigma^2}\right) \quad (11)$$

Thus, the optimal threshold can be obtained by determining the value of z which makes the missing probability of Eq (8) equal to false alarm probability of Eq (11). However, this highly intense procedure is not practical for real time application in the invention. Thus, in order to determine the threshold for real time application, a heuristic approach is adopted.

Thus, in accordance with the invention, reference is made back to the new acquisition system operation of the previous section. The signal energy (or the maximum correlator output) is obtained as the signal detection threshold and the noise energy is obtained at the output of the noise average filter. The signal energy detected by the signal detector is an instantaneous signal energy and is used as the rough estimate of signal energy of Eq (7). The energy of the noisy signal at the output of noise average filter is the estimate of the noisy signal energy of Eq (10). The real time adaptive signal classification threshold is obtained as the average of the signal energy estimate and the noise energy estimate.

$$T_{sc} = \frac{1}{2}(E(z/H_1) + E(z/H_0)) = \frac{1}{2}(4\sigma^2 + 2s^2) = 2\sigma^2 + s^2 \quad (12)$$

The corresponding false alarm probability can be obtained by using the threshold $T_{sc}$ of Eq (12) in place of the z in Eq (11).

$$P_F(T_{sc}) \equiv P_{FA} = \int_{T_{sc}}^{\infty} p_x(x/H_0)dx \qquad (13)$$

$$= \exp\left(-\frac{2\sigma^2 + s^2}{2\sigma^2}\right) = \left(-1 - \frac{SNR}{2}\right)$$

Thus, in accordance with the invention, the SNR estimate can be obtained by using the signal energy estimate, $T_{SD}$, of Eq (7) and the noisy signal energy estimate $E(z/H_0)$ of Eq (10):

$$\frac{SNR}{2} = \frac{T_{SD}}{E(z/H_0)} - 1 \qquad (14)$$

Thus, with the estimated SNR and its corresponding signal classification threshold, a false alarm event will happen at the false alarm rate, which is the inverse of the false alarm probability. Correspondingly, the number of incorrect cells, $C_N$, to be tested after signal detection for pre-verification can be estimated as one or two times the false alarm rate, depending upon the false alarm probability:

$$C_N = \frac{k}{P_F(T_{SC})} \qquad (15)$$

This $C_N$ in these equations is the equivalent to M noted above.

Thus, in step 220, if the noisy bin (or incorrect bin) counter m exceeds the threshold M (calculated as $C_N$ above), the acquisition system compares the SNR of the second dwell with constant threshold Tse2 in step 222. If the SNR exceeds Tse2, the acquisition system stops the search process and applies the verification logic in step 224 (as noted above). This happens when the acquisition system evaluates a reasonable number of noisy bins after obtaining a reliable PN code signal (or cell) and testing the reliability of its signal (or decision) quality.

If in step 222 the SNR does not exceed Tse2, the acquisition system proceeds to step 234. Similarly, at step 220, if the noisy bin counter m does not exceed the threshold M, the acquisition system proceeds to step 234 and the search continues.

In step 234 the acquisition system then compares the current phase "i" with the number of PN phases in the total PN space "q" to confirm whether all of the PN phases have been searched. The "q" represents the total number of PN spaces divided by chip resolution. In a preferred embodiment half chip resolution is used. Thus, if the current PN phase "i" reaches the total "q", then the acquisition system stops the search process, and control passes to step 224 where the verification logic (which will be explained below) is applied and the procedure is complete. This is an indication that the acquisition system has searched all of the possible PN space, and the system is then to test the signal, or the decision quality.

However, if the current PN phase "i" does not reach the total "q", then in step 234 i will not equal q and control passes to step 236.

In step 236, the phase of the locally generated PN code signal is incremented (or decremented) by half of a chip, a new PN code is generated in step 238, and the correlation is reexamined. The process continues in this manner until a hit occurs, i.e., (1−x) times the first signal detection Tsd1 is exceeded from the short correlation integration interval.

In step 212, if the frequency domain energy output at time t exceeds the (1−x) times signal detection threshold Tsd1 (which is the maximum energy output obtained previously until time t−1), where x is between 1/16 and 1/8, then in step 226 if the integrator output exceeds the first signal detection threshold Tsd1, the first signal detection threshold Tsd1 is replaced with the output of the integrator in step 228. The first signal classification threshold Tsc1 is replaced with the average value of the updated Tsd1 and the noise estimate obtained at the output of the noise estimator. If the integrator output exceeds the (1−x) times the first signal detection threshold Tsd1, where x is between 1/16 and 1/8, but is less than the threshold Tsd1, step 228 will be skipped and no threshold will be updated.

Next, in step 230, the acquisition system compares the SNR, obtained from the first dwell with a constant threshold Tse1. If the SNR does not exceed the threshold Tse1, the system resets the noisy bin (or incorrect cell) counter m to zero in step 232. Then, as noted above, if, in step 234, i=q, the acquisition system stops the search process and applies the verification logic in step 224. This happens when the acquisition system has searched all of the possible PN space and is thus testing the reliability of the signal or quality of the decision. If in step 234 i does not equal q, then in step 236 the phase of the locally generated code signal is changed by half of a chip, a new PN code is generated in step 238, and the correlation is re-examined.

If in step 230 the SNR exceeds the thresholds Tse1, then, without changing the PN code phase, the integration (dwell) time is increased by N2 samples in step 240. Next, in steps 242 and 244, K partial correlation values are obtained using the partial correlation process over the second (or long) integration interval of N2 samples. After obtaining J+K partial correlation values from both the first and second dwells, we add (L−J−K) zeros to the correlation buffers in step 246 and compute an L point FFT in ASIC hardware in step 248, using the hardware procedure noted above with respect to step 202. The frequency domain energy used with the FFT is obtained by choosing the largest energy over L frequency bins S(n), where n=1,2, . . . , L in step 250.

In step 252, if the second signal detection threshold Tsd2 is exceeded, it is replaced with the current output of the frequency domain energy of the second dwell in step 254. Also the signal classification threshold Tsc2 and the noisy bin counter threshold M are updated in step 256 as described above with respect to step 220. In step 232 the noisy bin counter m is initialized to zero. Then, as noted above, if in step 234, i=q, the acquisition system stops the search process and applies the verification logic in step 224. If in step 234 i does not equal q, then in step 236 the phase of the locally generated code signal is changed by half of a chip, a new PN code is generated in step 238, and the correlation is re-examined. Thus, a correct cell candidate was detected and now the number of incorrect cells after the correct cell candidate are counted for reliability confirmation.

If the second signal detection threshold Tsd2 was not exceeded in step 252, then in step 258, the acquisition system compares the present energy output with signal classification threshold Tsc2 (which is the optimal threshold between the noise estimates and signal detection threshold Tsd2). If the present energy output exceeds the signal classification threshold, the system resets the noisy bin counter m to zero in step 232. Then, as noted above, if in step 234, i=q, the acquisition system stops the search process and applies the verification logic in step 224. If in step 234 i does not equal q, then in step 236 the phase of the locally generated code signal is changed by half of a chip, a new PN code is generated in step 238, and the correlation is re-examined.

However, in step 258, if the signal energy (i.e., the output of the maximum frequency bin) does not exceed the signal classification threshold Tsc2, the noise estimate for the second dwell is updated in step 260 by feeding the frequency domain energy output to the noise estimator (1-pole IIR or averaging operator). The system increases the noisy bin counter m by 1 in step 218 (as noted above), and the noisy bin counter m is then compared with the threshold M in step 220. In step 220, if the noisy bin (or incorrect bin) counter m exceeds the threshold M, the acquisition system compares the SNR of the second dwell with constant threshold Tse2 in step 222. If the SNR exceeds Tse2, the acquisition system stops the search process and applies the verification logic in step 224, indicating that the acquisition system has evaluated a reasonable number of the noisy bins (or incorrect cells) after it obtained a reliable signal (or correct cell candidate).

If in step 222 the SNR does not exceed Tse2, the acquisition system proceeds to step 234. Similarly, at step 220, if the noisy BIN counter M does not exceed the threshold M, the acquisition system proceeds to step 234 and the search continues.

In step 234 the acquisition system then compares the current phase "i" with the number of PN phases in the total PN space "q" to confirm whether all of the PN phases have been searched. The "q" represents the total number of PN spaces divided by chip resolution. In a preferred embodiment half chip resolution is used. Thus, if the current PN phase "i" reaches the total "q", then the acquisition system stops the search process, and control passes to step 224 where the verification logic (which will be explained below) is applied and the procedure is complete. This is an indication that the acquisition system has searched all of the possible PN space, and the system is then to test the signal, or the decision quality.

However, if the current PN phase "i" does not reach the total "q", then in step 234 i will not equal q and control passes to step 236.

Thus, according to the invention, the received input signal is serially correlated with all possible code positions of the locally generated PN code replica and the corresponding threshold values and the maximum detector output are updated whenever the detector output exceeds the threshold value. This is done until the correlated energy output satisfies the necessary condition to stop the search process or the entire PN space is searched. At the end of this test or after determination of stop search processing, the correct PN alignment candidate is chosen as the local PN code phase position whose signal energy is the maximum.

Next, the verification logic employed at step 224 will be described. After the FTACMSC routine selects a PN code phase, the verification process is invoked in order to provide confidence in the selection. If an acceptable level of confidence is not achieved, the search process is immediately restarted. The verification logic includes the following steps:

1. Align local (receiver) PN code phase to the FTACMSC selected PN code phase (adjusted for time difference).
2. Collect L correlation values.
3. Compute L point FFT in hardware (with appropriate zero padding).
4. Store maximum magnitude, Ymaxj
5. Repeat above steps until k magnitudes are stored in memory buffer:
   Ymax=(Ymax1, Ymax2, . . . , Ymaxk).
6. Compare each element of Ymax to the maximum value $T_{SD2}$ attained in the second dwell.
   (Ymax>Thresh*$T_{SD2}$).
7. Values for k and Threshold used to generate the results provided in this test, by way of example, are: k=5 and Threshold=0.8.

Next, the method by which the frequency is estimated for the frequency offset condition is described. Computation of the FFT in the FTACMSC algorithm provides both the signal magnitude and relative frequency offset of the magnitude. When the maximum component in the FFT output vector is found the index can be used to estimate the frequency offset. The FFT alone accumulates energy at discrete frequencies. Thus the frequency resolution of a single FFT is a function of the FFT size and its sampling frequency. The verification logic provides k estimates of the received signals magnitude and frequency which can be used to improve the estimate. The qualifying frequency bins are averaged in an attempt to provide better frequency resolution. With the estimated frequency bin K where the maximum energy is found, the frequency offset can be estimated using the following equations.

$$\text{IF } (K < (L/2))$$
$$\hat{f} = \frac{K}{Tc \cdot L \cdot Np}$$
or
$$\hat{f} = \frac{K - L}{Tc \cdot L \cdot Np}$$

where Tc is the PN chip period, and Np is the partial correlation length used for the estimation of the correlation values. By estimating the frequency offset, acquisition can be performed accurately by the receiver, since this frequency offset will be taken into account.

Additional logic may be required if the expected frequency offset approaches the L/2 ambiguity boundary. However, for the examples set forth herein, no additional logic is required, as long as the frequency offset is within +/−16 KHz.

Thus in accordance with the invention, an improved acquisition system is provided which results in advantages over prior acquisition systems, especially in a frequency offset environment.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of searching for and acquiring a Code Division Multiple Access ("CDMA") signal, comprising the steps of:

receiving a CDMA signal;

extracting a Pseudo Noise (PN) signal from said received CDMA signal;

generating a local PN signal;

determining a frequency offset between said PN signal extracted from said received signal and said locally generated PN signal;

determining whether said received signal is a proper transmission signal; and decoding said received signal.

2. The method of claim 1, further comprising the step of applying a Fast Fourier Transform (FFT) process to a partial correlation between said received signal and said locally generated PN signal.

3. The method of claim 2, wherein said FFT process is implemented in hardware utilizing shifting and adding operations.

4. The method of claim 2, further comprising the steps of:

utilizing a short correlation length in said FFT process in order to estimate a Signal to Noise Ratio (SNR); and determining whether to use a long correlation length in a second FFT process based upon results of said FFT process with said short correlation length in order to determine a second estimated SNR.

5. The method of claim 4, further comprising the step of utilizing said second estimated SNR in part to determine whether said search should be stopped.

6. The method of claim 4, further comprising the step of utilizing said second estimated SNR in part determine a searching rate.

7. An apparatus for searching for and acquiring a Code Division Multiple Access ("CDMA") signal, comprising:

a receiver for receiving a CDMA signal;

means for extracting a Pseudo Noise (PN) signal from said received CDMA signal;

a signal generator for generating a local PN signal;

first means for determining a frequency offset between said PN signal extracted from said received signal and said locally generated PN signal;

second means for determining whether said PN signal extracted from received signal is a proper PN signal; and a decoder for decoding said received signal.

8. The apparatus of claim 7, wherein said first means applies a Fast Fourier Transform (FFT) to a partial correlation between said received signal and said locally generated PN signal.

9. The apparatus of claim 8, further comprising FFT hardware for implementing said FFT process in hardware.

10. The apparatus of claim 9, wherein said FFT hardware further comprises hardware for performing shift operations and hardware for addition operations.

11. The apparatus of claim 8, wherein said first means utilizes a short correlation length in said FFT process in order to estimate a Signal to Noise Ratio (SNR); and said apparatus further comprises third means for determining whether to use a long correlation length in a second FFT process based upon results of said FFT process with said short correlation length.

12. The apparatus of claim 11, wherein said first means utilizes said long correlation length in order to determine a second estimated SNR.

13. The apparatus of claim 12, further comprising means utilizing said second estimated SNR in part to determine whether said search should be stopped.

14. The apparatus of claim 12, further comprising means utilizing said second estimated SNR in part to determine a searching rate.

15. A method of searching for and acquiring a Code Division Multiple Access ("CDMA") signal in a frequency offset environment, comprising the steps of:

receiving a CDMA signal;

extracting a Pseudo Noise (PN) signal from said received CDMA signal;

generating a local PN signal;

implementing a Fast Fourier Transform (FFT) process in hardware utilizing shift operations and addition operations determining a frequency offset between said PN signal extracted from said received signal and said locally generated PN signal utilizing results of said FFT process;

determining whether said PN signal extracted from said received signal is a proper PN signal; and decoding said received signal.

16. The method of claim 15, further comprising the steps of:

utilizing a short correlation length in said FFT process in order to estimate a Signal to Noise Ratio (SNR); and determining whether to use a long correlation length in a second FFT process based upon results of said FFT process with said short correlation length in order to determine a second estimated SNR.

17. An apparatus for searching for and acquiring a Code Division Multiple Access ("CDMA") signal in a frequency offset environment, comprising:

a receiver for receiving a CDMA signal;

means for extracting a Pseudo Noise (PN) signal from said received CDMA signal;

a signal generator for generating a local PN signal;

hardware utilizing shift operations and addition operations for determining a Fast Fourier Transform (FFT) process;

first means for determining a frequency offset between said PN signal extracted from said received signal and said locally generated PN signal, said means for determining said frequency offset applying said FFT process to a partial correlation between said PN signal extracted from said received signal and said locally generated PN signal;

second means for determining whether said PN signal extracted from said received signal is a proper PN signal based in part upon results of applying said FFT process; and a decoder for decoding said received signal.

18. The apparatus of claim 17, wherein said first means utilizes a short correlation length in applying said FFT process in order to estimate a Signal to Noise Ratio (SNR); and wherein said apparatus further comprises third means for determining whether to use a long correlation length in a second FFT process based upon results of applying the first-mentioned FFT process with said short correlation length.

19. The apparatus of claim 17, wherein said acquisition system is also operable in an Additive White Gaussian Noise Environment.

* * * * *